United States Patent [19]

Hancock

[11] Patent Number: 5,086,661
[45] Date of Patent: Feb. 11, 1992

[54] VEHICLE STEERING COLUMN

[75] Inventor: Michael T. Hancock, Warwickshire, England

[73] Assignee: The Torrington Company, Torrington, Conn.

[21] Appl. No.: 571,711

[22] Filed: Aug. 24, 1990

[30] Foreign Application Priority Data

Sep. 21, 1989 [GB] United Kingdom ................. 8921321

[51] Int. Cl.$^5$ ............................................. B62D 1/18
[52] U.S. Cl. ....................................... 74/493; 464/89; 74/492
[58] Field of Search ................... 74/493, 492; 280/775; 464/89, 91, 97, 180

[56] References Cited

U.S. PATENT DOCUMENTS 2,272,900  2/1942  Saurer ................... 464/91

FOREIGN PATENT DOCUMENTS 2236991  2/1973  Fed. Rep. of Germany ........ 464/89
2847541  5/1980  Fed. Rep. of Germany ........ 464/89
2544816  10/1984  France ................................. 464/89
2184213  6/1987  United Kingdom .................. 74/493

Primary Examiner—Allan D. Herrmann
Assistant Examiner—David W. Laub
Attorney, Agent, or Firm—Michael H. Minns

[57] ABSTRACT

A vehicle steering column with means for adjusting the reach of a steering wheel in an axial direction relative to the column includes a coupling between a steering column shaft and a steering column tubular portion, the shaft and tubular portion being relatively slidable. The coupling incorporates a resilient member to provide preloaded torque resistance to inhibit transmission of rotational backlash through the steering column and the shaft and tubular portion are of non-circular section and the resilient member is of non-uniform thickness. In the unstressed state, a sleeve of the resilient member for surrounding the shaft is angularly offset and is twisted into alignment by the non-circular shaft upon assembly of the coupling to provide the torque resistance.

12 Claims, 3 Drawing Sheets

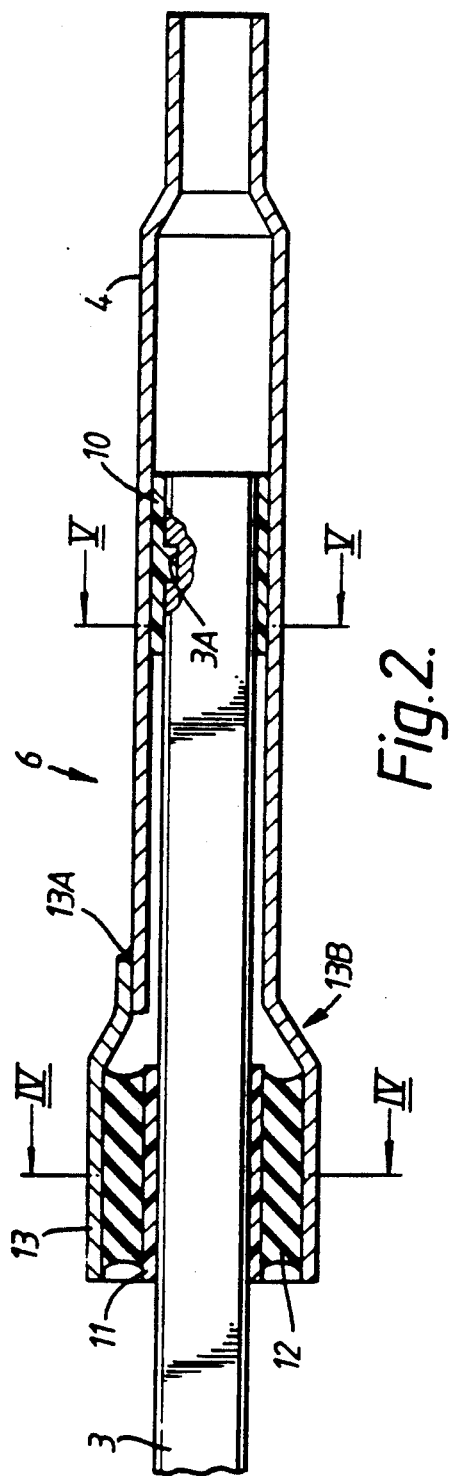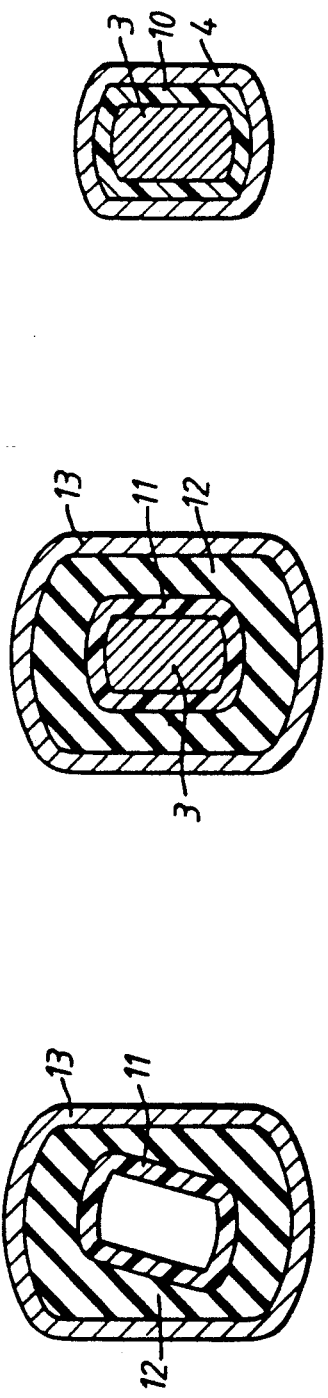

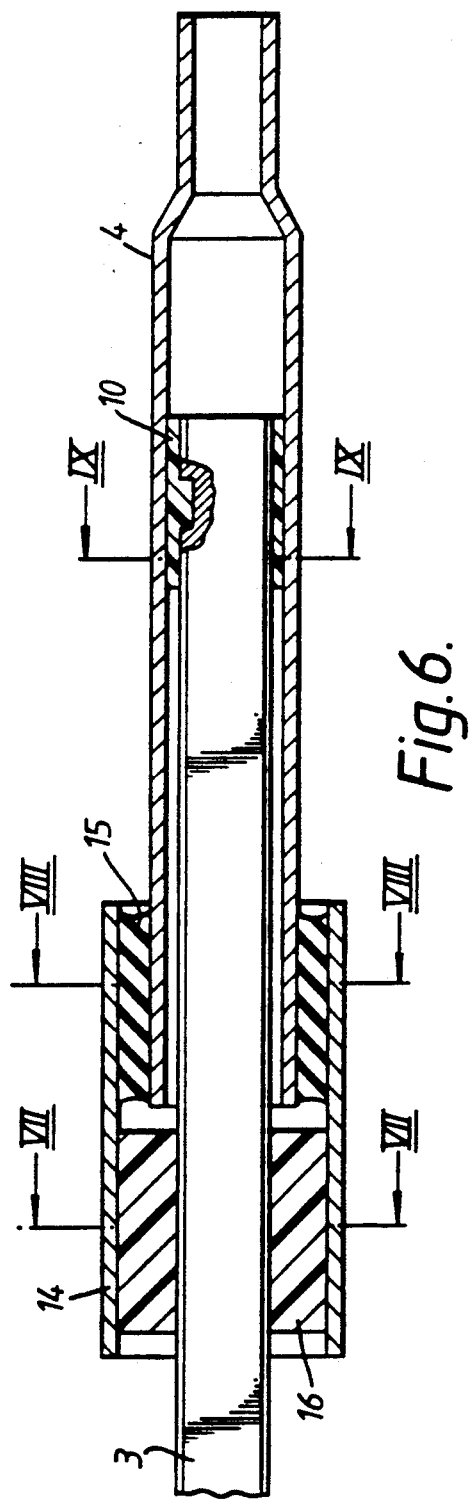
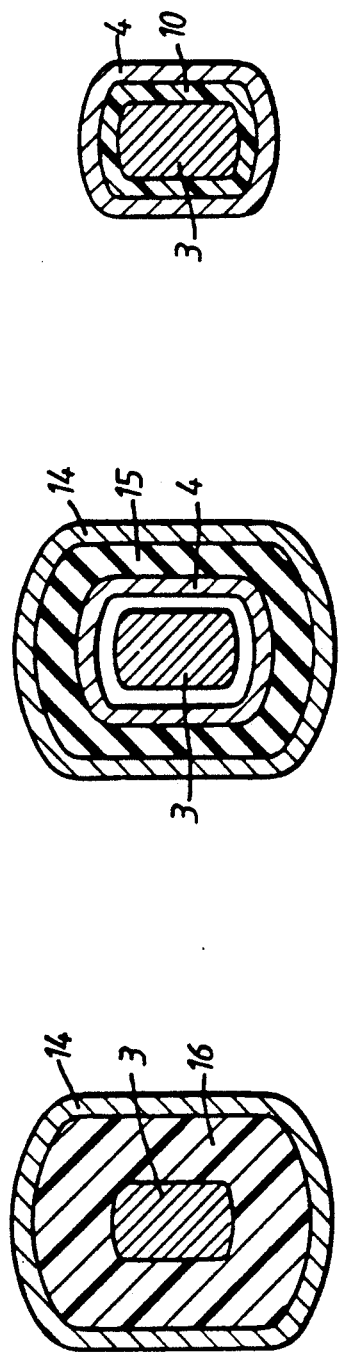

5,086,661

VEHICLE STEERING COLUMN

BACKGROUND OF THE INVENTION

This invention relates to a vehicle steering column and to a vehicle steering column with means for adjusting the reach of a steering wheel in an axial direction relative to the column. More particularly, the invention relates to means to limit rotational backlash for automobile or truck reach adjustable steering column systems.

A reach adjustable system is one where the steering wheel can be adjusted in an axial direction towards or away from the instrument panel of the vehicle. In order to produce an acceptable construction, the system should have a low friction adjustment with high torque capability and no perceptible backlash. Accordingly, a suitable system is provided including features more fully disclosed hereinafter.

SUMMARY OF THE INVENTION

According to one aspect of the present invention, there is provided a vehicle steering column including a coupling between two portions of the steering column, which coupling incorporates means to provide preloaded torque resistance to inhibit transmission of rotational backlash through the steering column, said means to provide preloaded torque resistance being a resilient member comprising an outer sleeve or tube and a coaxial inner sleeve or tube with a resilient material fixed between the two, the resilient material in the unstressed state having a non-uniform thickness around the inner sleeve or tube and the inner sleeve or tube being offset relatively to the outer sleeve or tube, so that, when the two portions of the steering column are aligned with one another with the coupling in place, the resilient member provides a resilient bias in one direction to inhibit transmission of rotational backlash between the two portions.

For a better understanding of the invention and to show how the same may be carried into effect, reference will now be made, by way of example, to the accompanying drawings.

BRIEF DESCRIPTION OF THE DRAWING FIGURES

FIG. 2 is a side view of the steering column showing a coupling between two portions thereof;

FIG. 3 is a cross-sectional view illustrating in an exaggerated way how preloaded torque resistance is given to the coupling;

FIG. 4 is a cross-sectional view taken on the line IV—IV in FIG. 2;

FIG. 5 is a cross-sectional view taken along the line V—V in FIG. 2;

FIG. 6 is a cross-sectional view showing an alternative embodiment;

FIG. 7 is a cross-sectional view taken on the line VII—VII in FIG. 6;

FIG. 8 is a cross-sectional view taken on the line VIII—VIII in FIG. 6; and

FIG. 9 is a cross-sectional view taken on the line IX—IX in FIG. 6.

DETAILED DESCRIPTION

Figure 1:
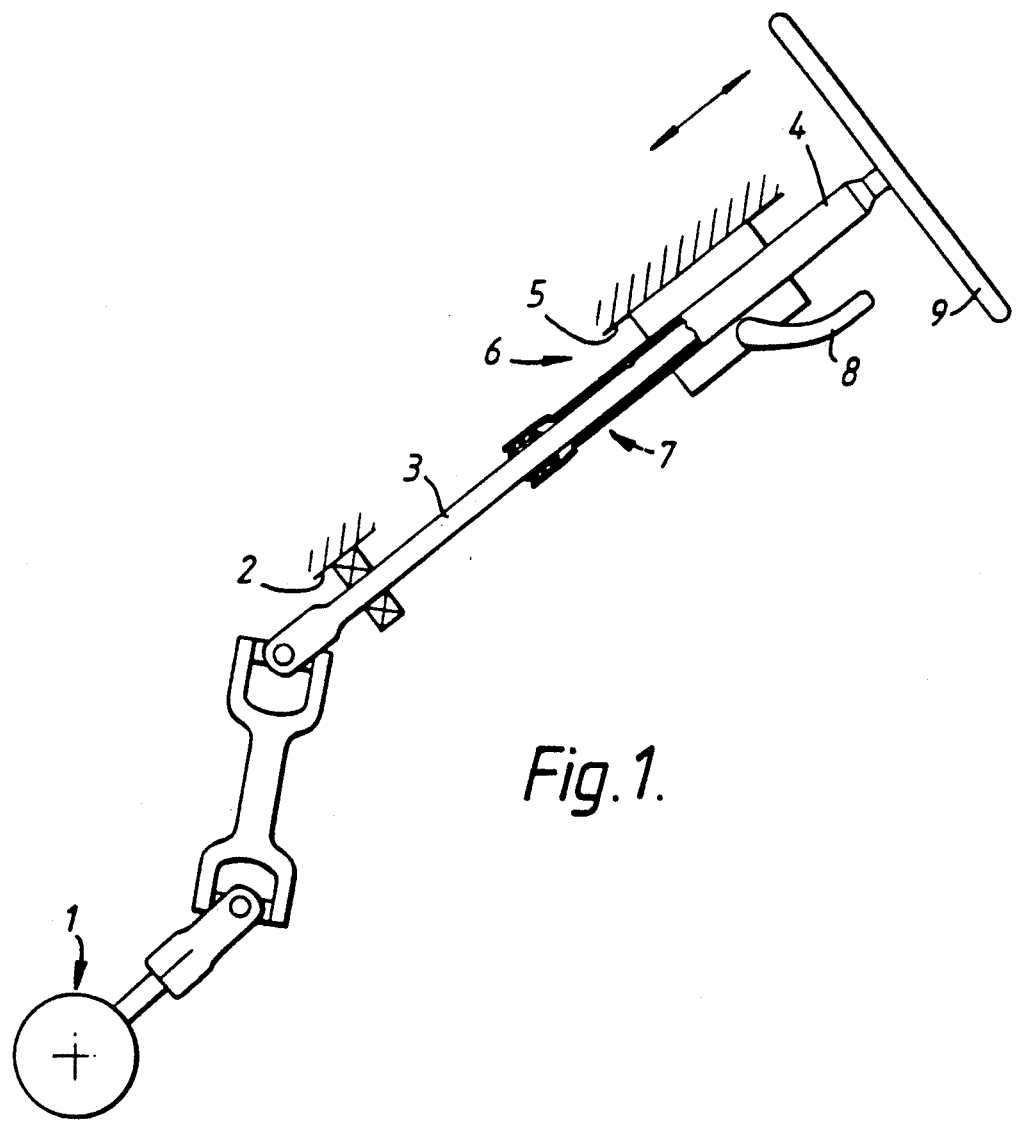
FIG. 1 is a diagrammatic side view of a vehicle steering column with means for adjusting the reach of a steering wheel in an axial direction relative to the column.

According to the present invention, there is advantageously provided a vehicle steering column with means for adjusting the reach of a steering wheel in an axial direction relative to the column, the steering column including a coupling between two portions of the steering column, which coupling incorporates means to provide preloaded torque resistance to inhibit transmission of rotational backlash through the steering column, the means to provide preloaded torque resistance being a resilient member comprising an outer sleeve or tube and a coaxial inner sleeve or tube with a resilient material fixed between the two, the resilient material in the unstressed state having a non-uniform thickness around the inner sleeve or tube and the inner sleeve or tube being offset relatively to the outer sleeve or tube, so that, when the two portions of the steering column are aligned with one another with the coupling in place, the resilient member provides a resilient bias in one direction to inhibit transmission of rotational backlash between the two portions.

Preferably, the coupling is incorporated in the means for adjusting the reach of the steering wheel.

The resilient material can be a rubber material. At least the inner sleeve or tube is of non-circular cross-section and preferably both the inner and outer sleeves or tubes have the same general profile. The preloaded torque resistance is provided by giving the resilient material a non-uniform thickness around the inner sleeve or tube. With this non-uniform thickness, in its unstressed state, the inner sleeve or tube is offset at a slight angle, preferably of some 3-5°, relatively to the outer sleeve or tube. When the coupling is made, the inner sleeve or tube is twisted to bring it into alignment with the outer sleeve or tube and it is this twisting against the resilient bias of the resilient material which provides the preloaded torque resistance in one direction of rotation to inhibit transmission of rotational backlash through the steering column.

The outer sleeve can be joined to one of the portions of the steering column, e.g., by welding, or it can form an integral part thereof. This portion of the steering column is accordingly in the region of the coupling of tubular cross-section. The other portion of the steering column in the region of the coupling, viz. the portion which is intended to pass through the inner sleeve or tube, can be a non-circular shaft or tube. The inner sleeve or tube can be of a plastics material.

Referring firstly to FIG. 1, the steering column includes a steering rack 1, a lower mounting point 2, an inner shaft 3 forming one major portion of the steering column, an outer tube 4 forming a second major portion thereof, an upper mounting point 5 and a coupling 6 which includes a reach adjustment device 7 with a clamping handle 8. A steering wheel 9 is shown attached to the upper end of the outer tube 4. The double arrow indicates the direction of reach adjustment of the steering wheel 9.

FIG. 2 shows in more detail how the coupling 6 between the two steering column portions 3 and 4 can incorporate means to provide preloaded torque resistance to inhibit transmission of rotational backlash through the steering column. It is the intention that this preloaded torque is constant in one direction, thus transferring any clearance in the system to flexure at the coupling, the coupling forming part of these reach adjustment device 7.

As illustrated, the lower, inner shaft 3 has a double-D section provided at its coupling end with a plastics clip-on bush 10, both the shaft 3 and bush 10 being located inside the upper, outer tube 4, which is also of double-D section. The main drive through the steering column is taken through these items with the safety aspect being covered by the mechanical drive of the double-D sections. The bush 10 seats in a slot 3A in the shaft 3, and the tube 4 and bush 10 are slidable relatively to one another, the bush 10 acting as a sliding guide element for the shaft 3 in the tube 4.

Providing the preloaded torque resistance to inhibit transmission of rotational backlash through the steering column, the coupling 6 includes a plastics sleeve 11 of a section matching that of the shaft 3 and closely fitting thereabout in slidable fashion, a resilient member in the form of a rubber tensioning bush 12 surrounding and joined to the plastics sleeve 11 and an outer sleeve 13 joined both to the rubber bush 12 and to the tube 4. The sleeve 13 can be joined to the tube 4 by welding as shown at 13A or it can form an integral part of the tube 4 as shown as an alternative construction at 13B.

FIG. 3 shows that part of the coupling including the resilient member before it is fitted about the shaft 3 and, therefore, before it is preloaded. As can be seen in this exaggerated view, the thickness of the rubber bush 12 is non-uniform around the sleeve 11 and between the sleeve 11 and the sleeve 13, so that the sleeve 11 is angularly out of alignment with the sleeve 13. When the coupling is made, the sleeve 11 is twisted against the resilient bias of the rubber bush 12 into alignment with it, thereby providing the preloaded torque resistance.

The degree of preload can be adjusted by varying the hardness of the rubber and/or the degree of displacement of the sleeve 11.

FIG. 6 shows a modification of the construction shown in FIGS. 2 and 5, the modification comprising the provision of an outer sleeve 14 which is connected to the outer tube 4 by a rubber tensioning bush 15 joined about the outer periphery of the tube 4. The rubber bush 15 has a similar construction and the same purpose as the rubber bush 12 of the first embodiment. A plastics bush 16 is fitted in between the outer sleeve 14 and the shaft 3 and it is this plastics bush 16 which is intended to transmit the main rotational effort between the two steering column portions from the steering wheel while allowing the shaft 3 to slide through it. Upon fitting the plastics bush 16, the system is brought into line and this imposes the preloaded torque resistance to both the plastic bushes 16 and 10 by reason of the angular displacement between the sleeve 14 and tube 4 imposed by the bush 15.

It is also envisaged that the couplings described above could be incorporated in a steering column without a reach adjustment facility.

Having described the invention, what is claimed is:

1. A vehicle steering column having a coupling between two portions of the steering column comprising:
    means for providing preloaded torque resistance to inhibit transmission of rotational backlash through the steering column, said means for providing preloaded torque resistance being a resilient member comprising an outer sleeve and a coaxial inner sleeve; and
    a resilient material fixed between the two, the resilient material in the unstressed state having an asymmetric non-uniform thickness around the inner sleeve and the inner sleeve being rotationally offset relative to the outer sleeve, so that, when the two portions of the steering column are aligned with one another with the coupling in place, the resilient material provides a resilient bias in one direction to inhibit transmission of rotational backlash between the two portions.

2. A vehicle steering column with means for adjusting the reach of a steering wheel in an axial direction relative to the column, said steering column having a coupling between two portions of the steering column comprising:
    means for providing preloaded torque resistance to inhibit transmission of rotational backlash through the steering column, said means for providing preloaded torque resistance being a resilient member comprising an outer sleeve and a coaxial inner sleeve; and
    a resilient material fixed between the two, the resilient material in the unstressed state having an asymmetric non-uniform thickness around the inner sleeve and the inner sleeve being rotationally offset relative to the outer sleeve, so that, when the two portions of the steering column are aligned with one another with the coupling in place, the resilient material provides a resilient bias in one direction to inhibit transmission of rotational backlash between the two portions.

3. A vehicle steering column according to claim 2, wherein said resilient material is a rubber material.

4. A vehicle steering column according to claim 3, wherein said inner sleeve is of non-circular cross-section.

5. A vehicle steering column according to claim 4, wherein both the inner and outer sleeves have the same general profile.

6. A vehicle steering column according to claim 5, wherein said outer sleeve is joined to one of said portions of the steering column.

7. A vehicle steering column according to claim 6, wherein said outer sleeve forms an integral part of one of said portions of the steering column.

8. A vehicle steering column according to claim 7, wherein said one portion is tubular and wherein the other said portion is a shaft.

9. A vehicle steering column according to claim 8, wherein said shaft is slidably mounted in said one portion and said resilient member.

10. A vehicle steering column according to claim 9, wherein said shaft is slidably mounted in said one portion by means of a plastics sleeve clipped onto the end of said shaft which is in the region of said coupling.

11. A vehicle steering column according to claim 10, wherein a further sleeve is provided, said resilient member connecting said further sleeve with said one portion of the steering column and there being a bush fitted between said further sleeve and the other said portion of the steering column, through which it can slide.

12. A coupling for joining two portions of a steering column, the coupling comprising:
    an outer sleeve having a non-circular cross-section;
    a co-axial inner sleeve having a non-circular cross-section, the inner sleeve being rotationally offset relative to the outer sleeve; and
    biasing means for providing preloaded torque resistance to inhibit transmission of rotational backlash through the steering column, the biasing means comprising resilient material between the inner sleeve and the outer sleeve, the resilient material having an asymmetric non-uniform thickness whereby, when the two portions of the steering column are aligned with the coupling in place, the resilient material provides a rotational bias.

* * * * *